(12) United States Patent
Fujikawa

(10) Patent No.: US 11,156,860 B2
(45) Date of Patent: Oct. 26, 2021

(54) DISPLAY PANEL

(71) Applicant: Sharp Kabushiki Kaisha, Sakai (JP)

(72) Inventor: Yohsuke Fujikawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/206,298

(22) Filed: Mar. 19, 2021

(65) Prior Publication Data
US 2021/0302777 A1 Sep. 30, 2021

Related U.S. Application Data

(60) Provisional application No. 63/002,552, filed on Mar. 31, 2020.

(51) Int. Cl.
*G02F 1/1333* (2006.01)
*G02F 1/1335* (2006.01)

(52) U.S. Cl.
CPC .. *G02F 1/133305* (2013.01); *G02F 1/133308* (2013.01); *G02F 1/133528* (2013.01); *G02F 1/133562* (2021.01); *G02F 1/133567* (2021.01); *G02F 2201/56* (2013.01)

(58) Field of Classification Search
CPC ......... G02F 1/133305; G02F 1/133562; G02F 1/133528; G02F 1/133567; G02F 1/133308; G02F 2201/56
See application file for complete search history.

(56) References Cited

U.S. PATENT DOCUMENTS

| | | | |
|---|---|---|---|
| 2014/0009914 A1* | 1/2014 | Cho | G09F 9/301 362/97.3 |
| 2016/0154271 A1* | 6/2016 | Kim | G02F 1/133308 349/58 |
| 2016/0320646 A1* | 11/2016 | Lee | G02F 1/1339 |
| 2019/0086604 A1* | 3/2019 | Yasunaga | G02F 1/133615 |

FOREIGN PATENT DOCUMENTS

JP 2016-218616 A 12/2016

* cited by examiner

*Primary Examiner* — Phu Vu
(74) *Attorney, Agent, or Firm* — Keating & Bennett, LLP

(57) ABSTRACT

A display panel includes: a first substrate having a display area and a non-display area outside the display area, the display area having an imaginary corner, the first substrate having a first corner corresponding to the imaginary corner; and a second substrate including a first portion opposite a main face of the first substrate and a second portion extending out of the first substrate, the second substrate having a second corner corresponding to the imaginary corner, wherein the first corner is either chamfered or rounded.

9 Claims, 8 Drawing Sheets

DISPLAY PANEL

CROSS-REFERENCE TO RELATED APPLICATION

The present application claims priority Provisional Application No. 63/002,552, the content to which is hereby incorporated by reference into this application.

BACKGROUND OF THE INVENTION

1. Field of the Invention

The present disclosure relates to display panels.

2. Description of the Related Art

Japanese Unexamined Patent Application Publication, Tokukai, No. 2016-218616 describes a display panel with a non-rectangular display area.

SUMMARY OF THE INVENTION

The display panel described in Japanese Unexamined Patent Application Publication, Tokukai, No. 2016-218616 includes a liquid crystal layer between an array substrate and a color filter substrate that have the same shape in a plan view. This display panel may undergo elastic deformation, for example, when bent. In such a situation, high stress concentrates on the corners of the array substrate and the corners of the color filter substrate. This stress concentration on the corners of the substrates causes the light passing through the substrates to exhibit birefringence. The photoelasticity introduces a phase difference, which in turn leads to an uneven display in the corners of the display area.

The present disclosure has a primary object to provide a display panel capable of reducing the chances of an uneven display in the corners of the display area.

Aspect 1

The present disclosure, in an aspect thereof, is directed to a display panel including: a first substrate having a display area and a non-display area outside the display area, the display area having an imaginary corner, the first substrate having a first corner corresponding to the imaginary corner; and a second substrate including a first portion opposite a main face of the first substrate and a second portion extending out of the first substrate, the second substrate having a second corner corresponding to the imaginary corner, wherein the first corner is either chamfered or rounded.

Aspect 2

In another aspect of the present disclosure, the display panel of aspect 1 is configured such that the first corner has a larger radius of curvature than does the second corner.

Aspect 3

In another aspect of the present disclosure, the display panel of aspect 1 or 2 is configured such that in a plan view, the imaginary corner is separated from the first corner by a smaller distance than from the second corner.

Aspect 4

In another aspect of the present disclosure, the display panel of any one of aspects 1 to 3 is configured such that the first substrate further has a third corner from which the imaginary corner is separated by a greater distance than from the first corner in a plan view, and the first corner has a larger radius of curvature than does the third corner.

Aspect 5

In another aspect of the present disclosure, the display panel of any one of aspects 1 to 4 is configured such that the first corner has either a curved side face or a pair of flat side faces that meet at an angle larger than 90°.

Aspect 6

In another aspect of the present disclosure, the display panel of any one of aspects 1 to 5 is configured such that the first substrate includes a glass plate.

Aspect 7

In another aspect of the present disclosure, the display panel of any one of aspects 1 to 6 is configured so as to further include a polarizer opposite either the first substrate or the second substrate, the polarizer having another corner corresponding to the imaginary corner, wherein the other corner of the polarizer is either chamfered or rounded.

Aspect 8

In another aspect of the present disclosure, the display panel of any one of aspects 1 to 7 is configured so as to further include a liquid crystal layer between the first substrate and the second substrate.

Aspect 9

In another aspect of the present disclosure, the display panel of aspect 8 is configured so as to further include, either on the first substrate or on the second substrate, a pair of electrodes through which voltage is applied across the liquid crystal layer.

Aspect 10

In another aspect of the present disclosure, the display panel of any one of aspects 1 to 9 is configured such that further including a housing in which the first substrate is fixed in an elastically deformed state.

Aspect 11

The present disclosure, in another aspect thereof, is directed to a display panel including: a liquid crystal layer; a first polarizer on a face of the liquid crystal layer, the first polarizer having a corner; and a second polarizer on another face of the liquid crystal layer, the second polarizer having another corner, wherein either one or both of the corners is/are chamfered or rounded.

Aspect 12

In another aspect of the present disclosure, the display panel of aspect 11 is configured such that the second polarizer has a part thereof extending out of the first polarizer, and the corner is either chamfered or rounded.

Aspect 13

In another aspect of the present disclosure, the display panel of aspect 12 is configured such that the corner has a larger radius of curvature than does the other corner.

Aspect 14

In another aspect of the present disclosure, the display panel of any one of aspects 11 to 13 is configured such that the display panel having a display area in an area containing the first polarizer and the second polarizer and a non-display area outside the display area, wherein the corner includes a first corner and a second corner, in a plan view, the display area is separated by a smaller distance from the first corner than from the second corner, and the first corner has a larger radius of curvature than does the second corner.

DETAILED DESCRIPTION OF THE INVENTION

First Embodiment

Figure 1A:
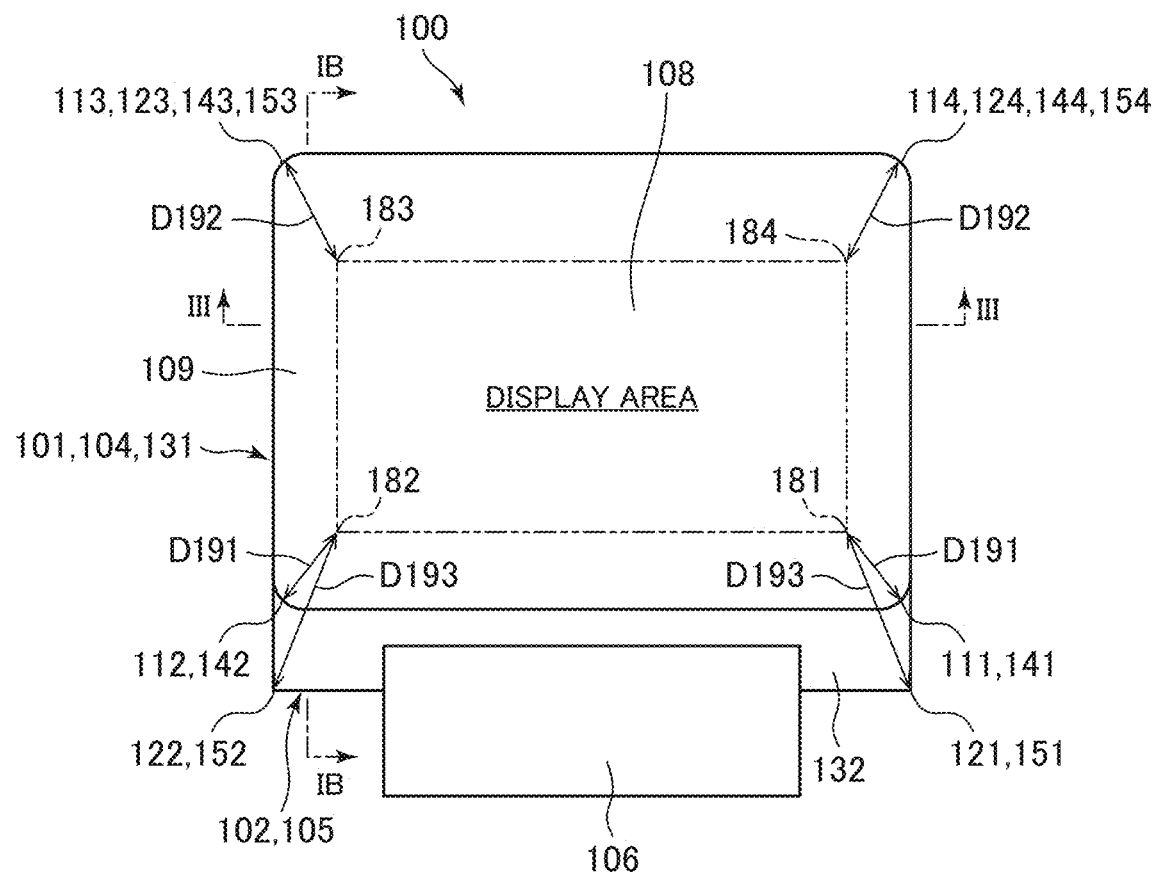
FIG. 1A is a schematic plan view of an exemplary display panel in accordance with a first embodiment.

The following will describe a first embodiment with reference to FIGS. 1 to 8. Identical or equivalent elements are denoted by the same reference numerals and symbols throughout the drawings. Redundant description will be omitted.

Figure 1B:
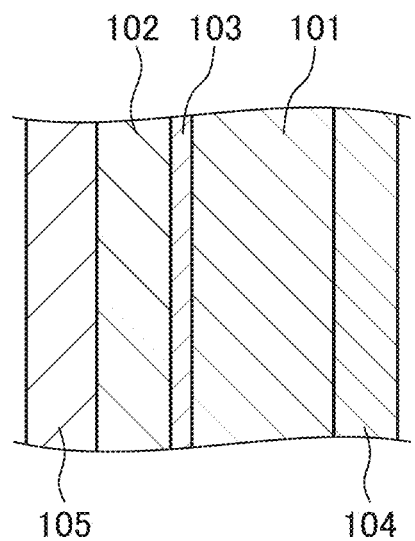
FIG. 1B is a partial cross-sectional view taken along line 1B-1B shown in FIG. 1A.

FIG. 1A is a schematic plan view of an exemplary display panel 100. FIG. 1B is a partial cross-sectional view taken along line IB-IB shown in FIG. 1A.

The display panel 100 is, for example, an in-plane switching liquid crystal panel. As shown in FIG. 1A, the display panel 100 is generally rectangular in a plan view with four chamfered or rounded corners. Referring to FIGS. 1A and 1B, the display panel 100 includes a first substrate 101, a second substrate 102, a liquid crystal layer 103, a first polarizer 104, a second polarizer 105, and a third substrate 106. The first polarizer 104, the first substrate 101, the liquid crystal layer 103, the second substrate 102, and the second polarizer 105 are stacked in this sequence when viewed thickness-wise.

Referring to FIG. 1A, the first substrate 101 has a display area 108 and a non-display area 109 outside the display area 108. The first substrate 101 is, for example, a color filter substrate (CF (color filter) substrate). The first substrate 101 includes a plate of glass, which is a transparent substance that exhibits birefringence under stress.

The display area 108 is an imaginary area in the center of the display panel 100 and rectangular in a plan view. The display area 108 is located opposite the rectangular liquid crystal layer 103. The display area 108 has an imaginary corner 181, an imaginary corner 182, an imaginary corner 183, and an imaginary corner 184. The first substrate 101 is generally rectangular in a plan view and has a corner 111 (first corner), a corner 112 (first corner), a corner 113 (third corner), and a corner 114 (third corner). The corner 111 and the corner 112 are round (i.e., arc-shaped). The corner 113 and the corner 114 are round, but may be angular. The description below assumes, for convenience, that the first substrate 101 and the display area 108 are symmetric in the left-right direction in a plan view.

Referring to FIG. 1A, the imaginary corner 181 and the corner 111 are separated by a distance D191, and the imaginary corner 183 and the corner 113 are separated by a distance D192. The imaginary corner 182 and the corner 112 are separated by the distance D191, and the imaginary corner 184 and the corner 114 are separated by the distance D192. The distance D191 is shorter than the distance D192.

The second substrate 102 is disposed in such a manner that a part of a main face thereof is located opposite an entire main face of the first substrate 101. The main face in the present embodiment is, as an example, the face on which wiring and related elements are formed by patterning and films are stacked in a film forming step. The second substrate 102 has a first portion 131 and a second portion 132. The first portion 131 resides opposite the first substrate 101. The second portion 132 extends out of the first substrate 101. The second substrate 102 is, for example, an array substrate such as a TFT (thin film transistor) substrate. The second substrate 102 includes a plate of glass, which is an example of a transparent substance that exhibits birefringence under stress.

The second substrate 102 has a corner 121 (second corner), a corner 122 (second corner), a corner 123, and a corner 124 in a plan view. The description below assumes, for convenience, that the first substrate 101 and the display area 108 are symmetric in the left-right direction in a plan view. The corner that is the closest to an imaginary corner will be referred to as the corner corresponding to that imaginary corner, for convenience, throughout the description below. The corner 121 and the corner 122 shown in FIG. 1A are 90° in a plan view. In contrast, the corner 123 and the corner 124 are round. The corner 111 or the corner 112 has a larger radius of curvature than does the corner 114 or the corner 124. Because the corner 111, the corner 112, the corner 113, the corner 123, the corner 114, and the corner 124 each form an imaginary arc that is a part of an imaginary circle, the "radius of curvature" in the present embodiment refers to the radius of curvature r of this imaginary circle (see FIG. 2). When the corner is neither chamfered nor rounded and, for example, 90°, the radius of curvature equals 0.

The distance D191 between the imaginary corner 181 and the corner 111 is shorter than the distance D192 between the imaginary corner 184 and the corner 114 in a plan view. The distance D192 between the imaginary corner 184 and the corner 114 is shorter than a distance D193 between the imaginary corner 181 and the corner 121 in a plan view. In other words, there is a relationship, D191<D192<D193, as shown in FIG. 1A. Therefore, of the forces acting on the corner 111, the corner 114, and the corner 121, the force acting on the corner 111 exerts a maximum stress on the imaginary corner 181 in the present embodiment. Accordingly, in the present embodiment, among the corner 111, the corner 114, and the corner 121, the corner 111 has the gentlest shape, in other words, a shape with a maximum radius of curvature, to mitigate the maximum stress acting on the imaginary corner 181. Delving into the relationship between the distance D191, the distance D192, and the distance D193 and the radius of curvature of the corner 111, the radius of curvature of the corner 114, and the radius of curvature of the corner 121, the radius of curvature of the real corner increases with a decrease in the distance between the real corner and the imaginary corner.

The first substrate 101, the second substrate 102, and the display area 108 are symmetric in the left-right direction in a plan view as shown in FIG. 1A. The distances between the imaginary corner 182, the corner 112, the corner 122, and the corner 113 therefore have the same relationship as the distances between the imaginary corner 181, the corner 111, the corner 121, and the corner 114. Accordingly, in the present embodiment, among the corner 112, the corner 113, and the corner 122, the corner 112 has the gentlest shape, in other words, a shape with a maximum radius of curvature, to mitigate the maximum stress acting on the imaginary corner 182.

The second portion 132 is where external members are attached and includes, for example, an area for wiring and an area for markings used in manufacturing process management.

The third substrate 106 is where a FPC (flexible printed circuit) is provided. The third substrate 106 is at least partially disposed on the second portion 132, in other words, on a part of the second substrate 102 extending beyond the first substrate 101.

Referring to FIG. 1A, the first polarizer 104 is identical in shape to the first substrate 101 in a plan view. The first polarizer 104 has a corner 141 (corner, first corner) and a corner 142 (corner, first corner) corresponding respectively to the imaginary corner 181 and the imaginary corner 182. The corner 141 and the corner 142 are chamfered or rounded. The first polarizer 104 has a corner 143 (corner, second corner) and a corner 144 (corner, second corner) corresponding respectively to the imaginary corner 183 and the imaginary corner 184. The corner 143 and the corner 144 are chamfered or rounded, but may be angular.

Referring to FIG. 1A, the second polarizer 105 is identical in shape to the second substrate 102 in a plan view. The second polarizer 105 has a corner 151 (other corner), a corner 152 (other corner), a corner 153 (other corner), and a corner 154 (other corner) corresponding respectively to the imaginary corner 181, the imaginary corner 182, the imaginary corner 183, and the imaginary corner 184. The second polarizer 105 partially extends out of the first polarizer 104. The relationship, D191<D192<D193, holds as described earlier. The corner 141 and the corner 142 of the first polarizer 104 have a larger radius of curvature than do the corner 143 and the corner 144 of the first polarizer 104. Accordingly, among the corner 141, the corner 144, and the corner 151, the corner 141 has the gentlest shape, in other words, a shape with a maximum radius of curvature. The second polarizer 105 may be identical in shape to the first substrate 101. In other words, the second polarizer may be identical in shape to the first polarizer.

Referring to FIG. 1B, the liquid crystal layer 103 contains liquid crystal molecules and resides between the first substrate 101 and the second substrate 102. Liquid crystal molecules change the optical properties thereof in response to the application of an electric field. There is provided a pair of electrodes on either the first substrate 101 or the second substrate 102 to apply a voltage to the liquid crystal layer 103.

The first polarizer 104 is disposed on one of the two surfaces of the liquid crystal layer 103, opposite the first substrate 101. The first polarizer 104 includes a base substrate and an adhesive for supporting a polarizer. These base substrate and adhesive are made of a transparent substance that exhibits birefringence under stress.

The second polarizer 105 is disposed on the other surface of the liquid crystal layer 103, opposite the second substrate 102. The second polarizer 105 includes a base substrate and an adhesive for supporting a polarizer. These base substrate and adhesive are made of a transparent substance that exhibits birefringence under stress. The display area 108 resides in the same area as the first polarizer 104 and the second polarizer 105.

Figure 2:
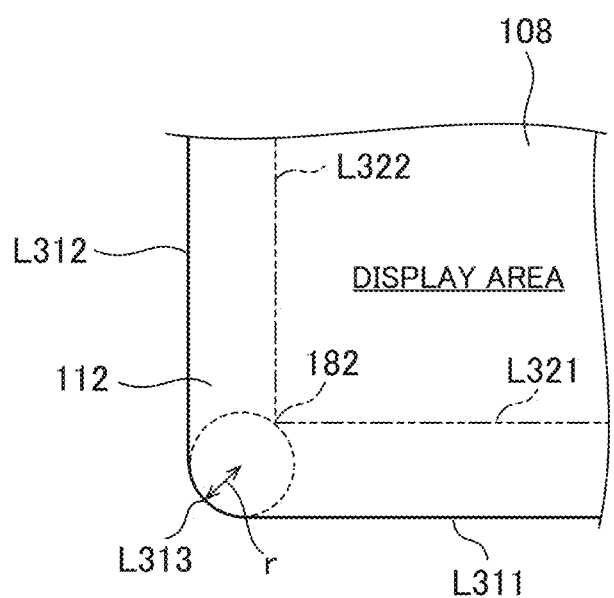
FIG. 2 is a schematic partial plan view of an exemplary second corner of a first substrate in accordance with the first embodiment.

FIG. 2 is a schematic partial plan view of an example of the corner 112 of the first substrate 101. In FIG. 2, the imaginary corner 182 of the display area 108 is represented in a plan view by an imaginary line segment L321 and an imaginary line segment L322 that cross at right angles. Additionally, the corner 112 is represented in a plan view by a line segment L311, a line segment L312, and a curved line L313. In other words, the corner 112 has a partially curved side face.

A description is given next of the display panel 100 as it is elastically deformed.

Figure 3:
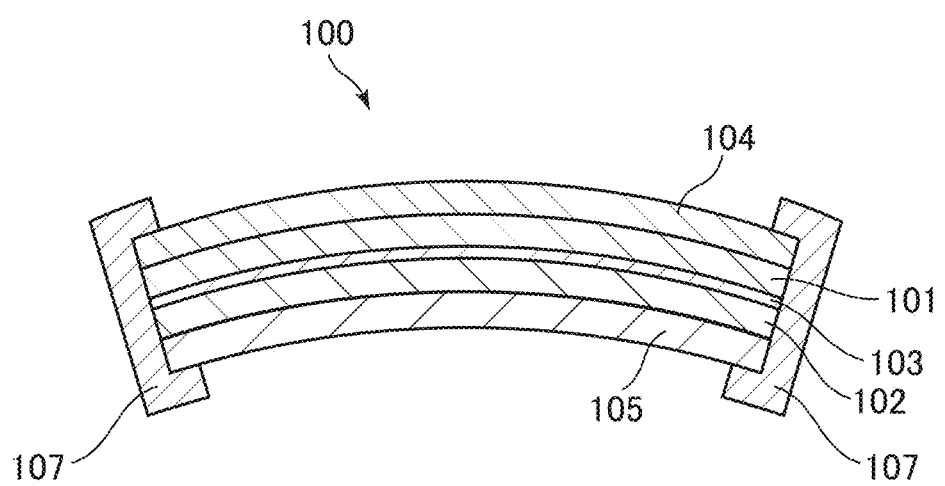
FIG. 3 is a partial cross-sectional view taken along line shown in FIG. 1A, showing the display panel when the display panel is elastically deformed.

Referring to FIG. 3, the display panel 100 in accordance with the present embodiment includes a housing 107 in which the first substrate 101 is fixed in an elastically deformed state. The photoelasticity of the glass plates in the first substrate 101 and the second substrate 102 causes the light incident to the display panel 100 to undergo birefringence. The light exiting the liquid crystal layer 103 therefore has a phase difference. Additionally, when the display panel 100 is elastically deformed, high stress concentrates on the corners of the first substrate 101 and the second substrate 102. As a result, when the display panel 100 is elastically deformed, both the photoelasticity and the phase difference of the light can be a likely cause of a visually recognizable uneven display in the corners of the display area 108, especially, as an example, in the imaginary corner 182 and the vicinity thereof.

The corner 111 and the corner 112 are located closer to the corresponding imaginary corners of the display area 108 than are the corner 113 and the corner 114, in the present embodiment described with reference to FIGS. 1 to 3. Accordingly, the corner 111 and the corner 112 have a larger radius of curvature than the corner 113 and the corner 114 in the present embodiment. The corner relatively close to the corresponding imaginary corner of the display area 108 consequently has a gentler shape than the corner relatively far from the corresponding imaginary corner of the display area 108. Stress concentration is hence more reliably restrained in the imaginary corner 181 and the imaginary corner 182 than in the imaginary corner 183 and the imaginary corner 184. As a result, an uneven display is more reliably restrained in the imaginary corner 181 and the imaginary corner 182 than in the imaginary corner 183 and the imaginary corner 184. By more reliably restraining an uneven display in the corners where it is relatively likely in this manner, an uneven display is rendered less likely across the display panel 100.

Similarly, when the display panel 100 is elastically deformed, the photoelasticity of the glass plates in the first polarizer 104 and the second polarizer 105 causes the light incident to the display panel 100 to undergo birefringence. The light exiting the liquid crystal layer 103 therefore has a phase difference. Additionally, when the display panel 100 is elastically deformed, high stress concentrates on the corners of the first polarizer 104 and the second polarizer 105. As a result, when the display panel 100 is elastically deformed, both the photoelasticity and the phase difference of the light can be a likely cause of a visually recognizable uneven display in the corners of the display area 108, especially, as an example, in the imaginary corner 182 and the vicinity thereof.

The corner 141 and the corner 142 of the first polarizer 104 are located closer to the display area 108 than are the corner 143 and the corner 144 of the first polarizer 104, in the present embodiment described with reference to FIGS. 1 to 3. Accordingly, the corner 141 and the corner 142 of the first polarizer 104 have a larger radius of curvature than the corner 143 and the corner 144 of the first polarizer 104. Stress concentration is hence more reliably restrained in the imaginary corner 181 and the imaginary corner 182 of the display area 108 than in the imaginary corner 183 and the imaginary corner 184. By more reliably restraining an uneven display in the imaginary corner 181 and the imaginary corner 182 than in the imaginary corner 183 and the imaginary corner 184 in this manner, an uneven display is rendered less likely across the display panel 100.

The second substrate 102 provides a greater mounting area when the corner 121, the corner 122, the corner 123, and the corner 124 of the second substrate 102 are approximately 90° in a plan view than when the corner 121, the corner 122, the corner 123, and the corner 124 of the second substrate 102 are chamfered or rounded. Additionally, the second substrate 102 can be manufactured with a limited cost increase when the corner 121, the corner 122, the corner 123, and the corner 124 of the second substrate 102 have a shape that is simple to fabricate (e.g., approximately 90° in a plan view).

The display area 108 may have at least one gently shaped corner when, for example, an uneven display can be rendered less likely by a video pattern displayed in the display area 108 (e.g., through the choice and layout of colors). When this is the case, the other, relatively non-gentle corners may have a structure that renders an uneven display less recognizable by the shades of color of the displayed video.

For instance, in an in-plane switching liquid crystal panel, an uneven display can be recognizable when the panel is reproducing a black image. Accordingly, a video containing many relatively bright shades of color (e.g., white) and many relatively low visibility shades of color (e.g., blue) may be reproduced in those corners (and in the vicinity thereof) of the display area 108 where an uneven display is relatively likely in comparison with the other corners of the display area 108 when the first substrate 101 and the second substrate 102 undergo elastic deformation. Alternatively, the corners of the first substrate 101 and the second substrate 102 may have a gentle shape, and an uneven display be rendered less likely through the video displayed in the display area 108.

If the display panel 100 is manufactured in such a manner that the display area 108 is flat, the display panel 100 may be placed under stress, for example, when the user twists the display panel 100. The display panel 100, however, having this structure, can reduce stress concentration in the imaginary corner 181, the imaginary corner 182, the imaginary corner 183, and the imaginary corner 184 of the display area 108. The display panel 100 can hence render an uneven display less likely under elastic deformation in the imaginary corner 181, the imaginary corner 182, the imaginary corner 183, and the imaginary corner 184 of the display area 108.

Variation Example 1

Figure 4:
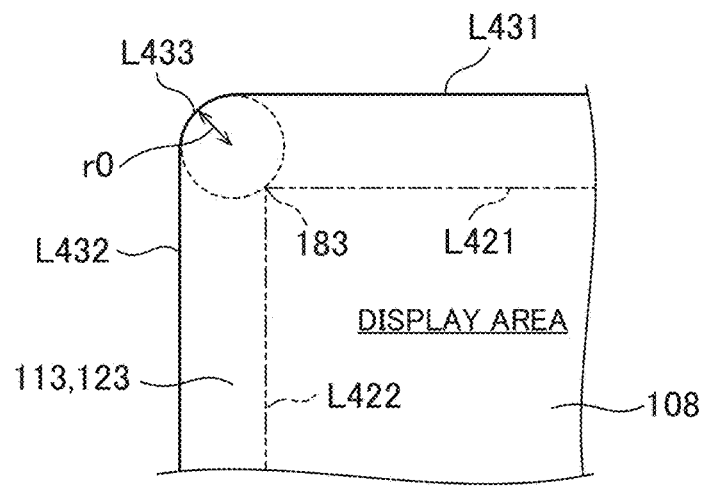
FIG. 4 is a schematic partial plan view of a variation example of the second corner of the first substrate in accordance with the first embodiment.
Figure 4:
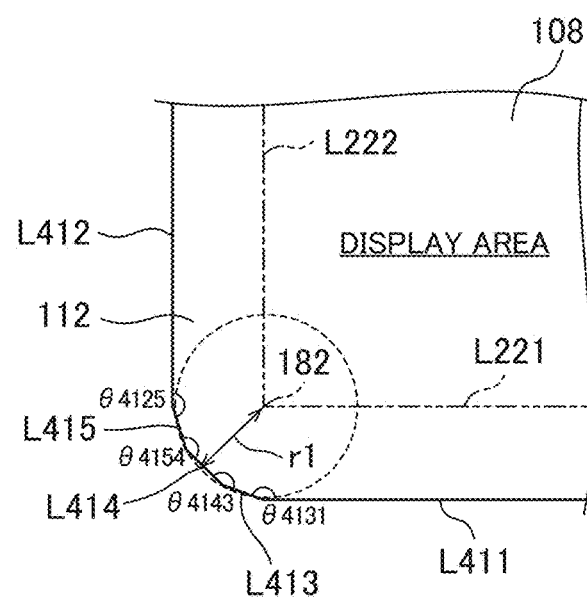

FIG. 4 is a schematic partial plan view of a variation example of the corner 112 and the corner 113 of the first substrate 101. In FIG. 4, the imaginary corner 182 of the display area 108 is represented in a plan view by an imaginary line segment L221 and an imaginary line segment L222 that cross at right angles. Additionally, as shown in FIG. 4, the corner 112 of the first substrate 101 is formed so as to connect a line segment L411 and a line segment L412 in a plan view. The corner 112 is made up of a combination of planes as indicated by a plurality of line segments, for example, a line segment L413, a line segment L414, and a line segment L415 in FIG. 4.

In FIG. 4, the line segment L411 and the line segment L413 make an angle θ4131 in a plan view, the line segment L413 and the line segment L414 make an angle θ4143 in a plan view, the line segment L414 and the line segment L415 make an angle θ4154 in a plan view, and the line segment L415 and the line segment L412 make an angle θ4125 in a plan view. The angle θ4131, the angle θ4143, the angle θ4154, and the angle θ4125 are all obtuse angles. In other words, the corner 112 has a side face made up of at least a pair of planes that meet at an angle larger than 90° in FIG. 4.

In FIG. 4, the imaginary corner 183 of the display area 108 is represented in a plan view by an imaginary line segment L421 and an imaginary line segment L422 that cross at right angles. Additionally, the corner 113 and the corner 123 are represented in a plan view by a line segment L431, a line segment L432, and a curved line L433. In other words, the corner 113 and the corner 123 have a partially curved side face.

The "radius of curvature" throughout this specification refers to the radius r1, r0 of the imaginary circumcircle that is circumscribed around all the curved faces. Likewise, in subsequent embodiments and variation examples, the "radius of curvature" also refers to the radius of the imaginary circumcircle that is circumscribed around all the curved faces.

The relationship, "r1>r0," holds, and the corner 112 is closer to the corresponding imaginary corner of the display area 108 than are the other corners of the first substrate 101 and the second substrate 102. In the variation example of the corner 112 shown in FIG. 4, the corner that is relatively close to the corresponding imaginary corner of the display area 108, among all the corners of the first substrate 101 and the second substrate 102, similarly has the gentlest shape, in other words, a shape with a maximum radius of curvature. For the reasons given earlier, an uneven display is rendered less likely across the display panel 100.

The corner 111 may be identical in shape to the corner 112 shown in FIG. 4 and may have a different shape from the corner 112. At least one of the corner 121, the corner 122, the corner 123, the corner 124, the corner 113, and the corner 114 may have the shape shown in FIG. 4.

Variation Example 2

Figure 5:
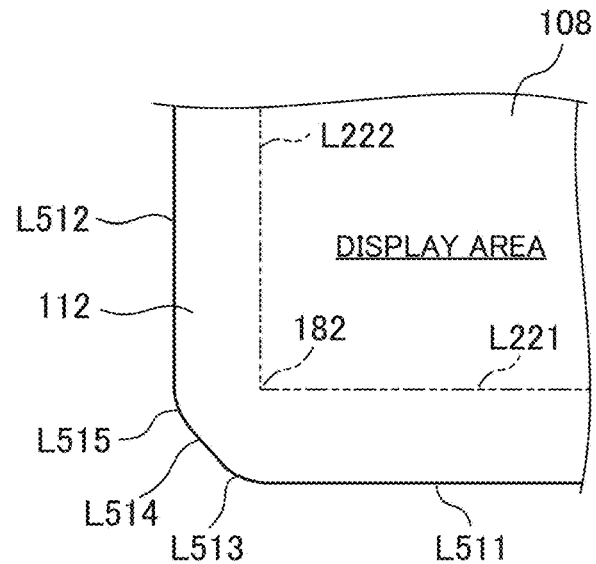
FIG. 5 is a schematic partial plan view of a variation example of the second corner of the first substrate in accordance with the first embodiment.

FIG. 5 is a schematic partial plan view of a variation example of the corner 112 of the first substrate 101. In FIG. 5, the imaginary corner 182 is represented in a plan view by the imaginary line segment L221 and the imaginary line segment L222 that cross at right angles. Referring to FIG. 5, in a plan view, the corner 112 resides between a line segment L511 and a line segment L512 and is shaped by a combination of a line segment L514, a curved line L513, and a curved line L515. In other words, the corner 112 shown in FIG. 5 has a plurality of curved side faces. In other words, the corner 112 shown in FIG. 5, in a plan view, has a plurality of chamfered shapes and an arc shape connecting the chamfered portions together.

In the variation example of the corner 112 shown in FIG. 5, the corner that is relatively close to the corresponding imaginary corner of the display area 108, among all the corners of the first substrate 101 and the second substrate 102, has the gentlest shape, in other words, a shape with a maximum radius of curvature. For the reasons given earlier, an uneven display is rendered less likely across the display panel 100.

The corner 111 may be identical in shape to the corner 112 shown in FIG. 5 and may have a different shape from the corner 112. At least one of the corner 121, the corner 122, the corner 123, the corner 124, the corner 113, and the corner 114 may have the shape shown in FIG. 5.

Variation Example 3

Figure 6:
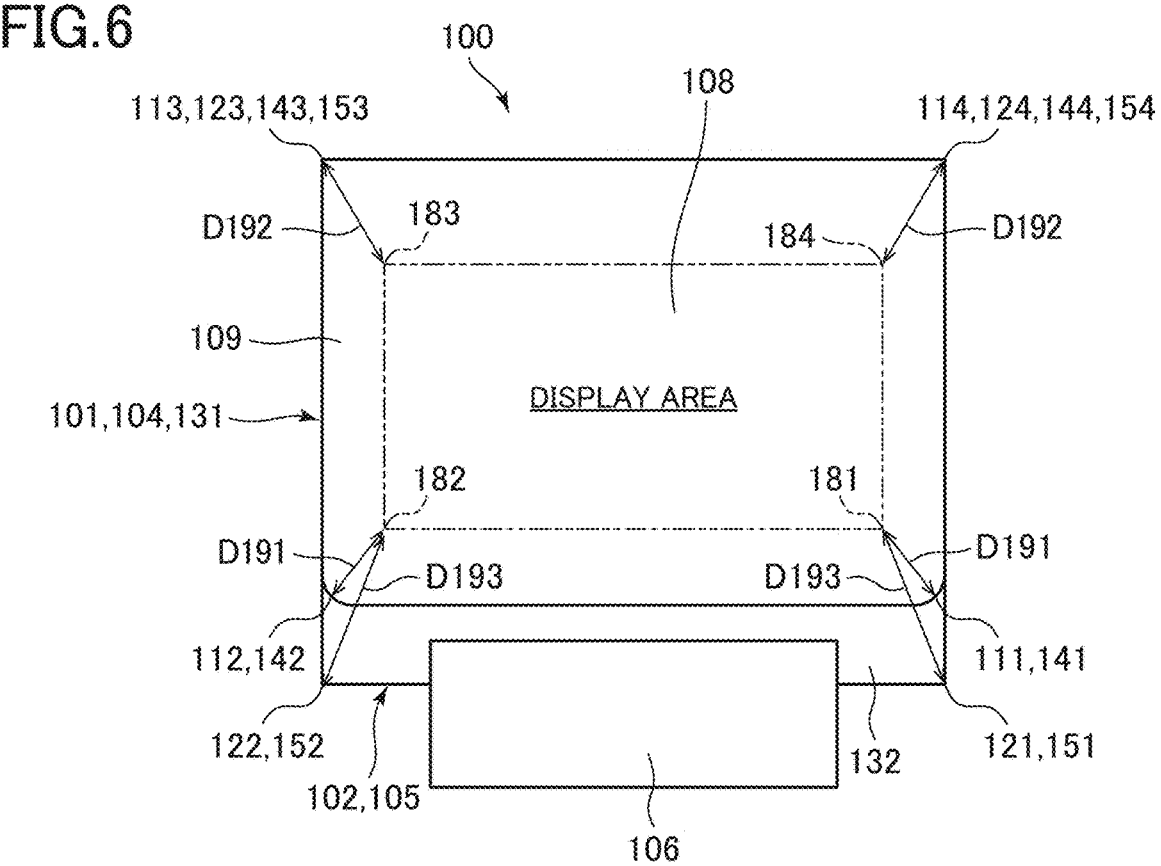
FIG. 6 is a schematic plan view of a variation example of the display panel in accordance with the first embodiment.

FIG. 6 is a schematic plan view of a variation example of the display panel 100. The display panel 100 of the present variation example differs from the display panel 100 shown in FIG. 1A in that the corner 113, the corner 114, the corner 123, and the corner 124 are approximately 90° in a plan view. In the display panel 100 of the present variation example, only the corners that are the closest to the display area 108 (i.e., the corner 111 and the corner 112) have the gentlest shape, in other words, a shape with a maximum radius of curvature, among all the corners of the first substrate 101 and the second substrate 102. For the reasons given earlier, an uneven display is rendered less likely across the display panel 100.

Variation Example 4

Figure 7:
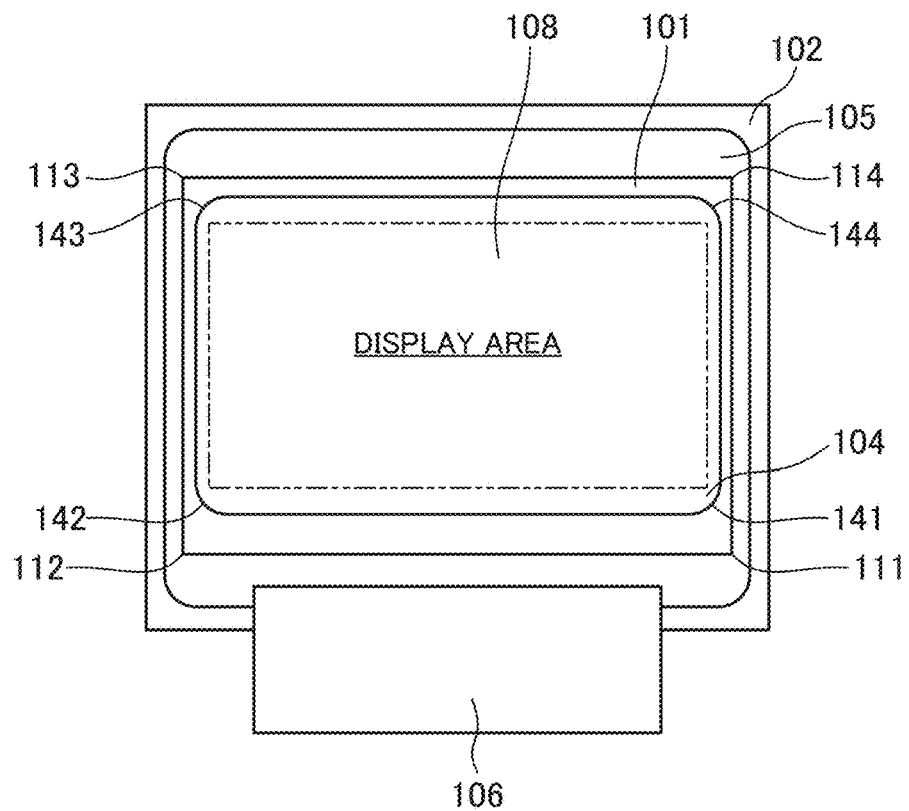
FIG. 7 is a schematic plan view of a variation example of the display panel in accordance with the first embodiment.

FIG. 7 is a schematic plan view of a variation example of the display panel 100. The display panel 100 of the present variation example differs from the display panel 100 shown in FIG. 1A in that the first substrate 101 is somewhat larger than the first polarizer 104 and that the second substrate 102 is somewhat larger than the second polarizer 105. In addition, the first substrate 101 and the second substrate 102 are rectangular in a plan view in the display panel 100 of the present variation example.

In contrast, the corner 141, the corner 142, the corner 143, and the corner 144 of the first polarizer 104 are chamfered and rounded because the corner 141, the corner 142, the corner 143, and the corner 144 of the first polarizer 104 are relatively close to the corresponding corners of the display area 108 in comparison with the corner 111, the corner 112, the corner 113, and the corner 114 of the first substrate 101. In other words, the corner 141, the corner 142, the corner 143, and the corner 144 of the first polarizer 104, which are the closest to the display area 108, similarly have a shape with a larger radius of curvature, in other words, the gentlest shape, in the present variation Example 4. For the reasons given earlier, an uneven display is rendered less likely across the display panel 100.

Second Embodiment

A description will be given next of a second embodiment. Identical or equivalent elements are denoted by the same reference numerals, and description thereof is not repeated. Description that appears in another embodiment will not be repeated in the following.

Figure 8:
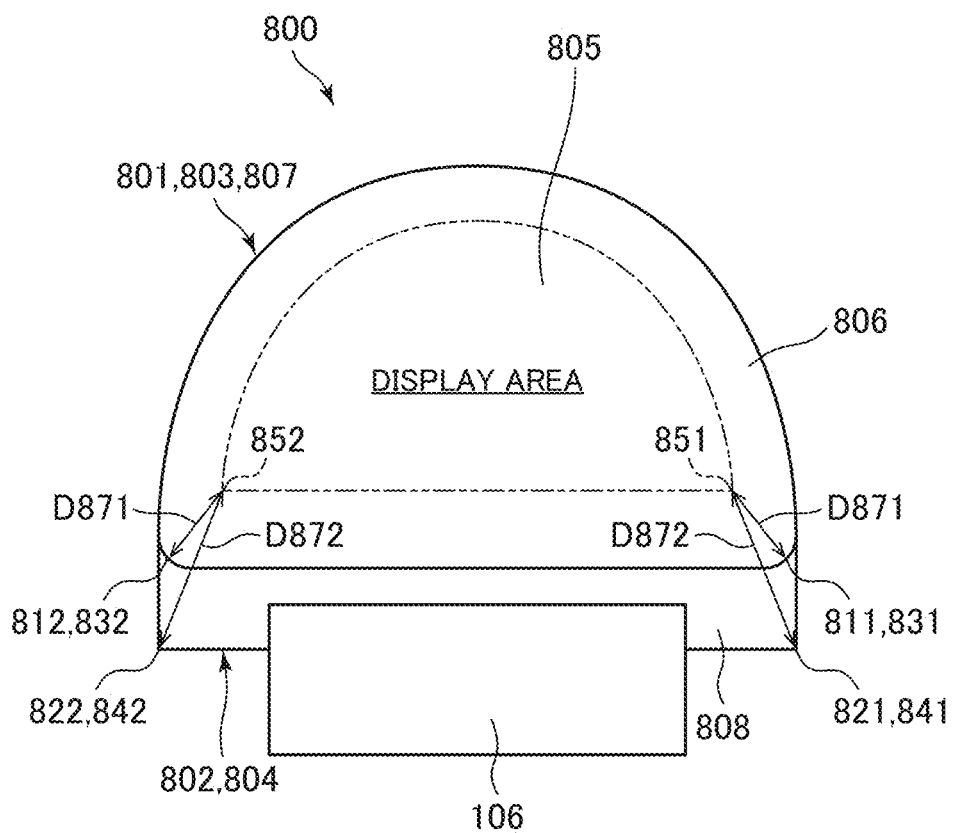
FIG. 8 is a schematic plan view of an exemplary display panel in accordance with a second embodiment.

FIG. 8 is a schematic plan view of an exemplary display panel 800. The display panel 800 includes a first substrate 801, a second substrate 802, a first polarizer 803, a second polarizer 804, and a display area 805 in place of the first substrate 101, the second substrate 102, the first polarizer 104, the second polarizer 105, and the display area 108 in accordance with the first embodiment.

The first substrate 801 includes the display area 805 and a non-display area 806 outside the display area 805. The first substrate 801 shown in FIG. 8 is semicircular in a plan view and has a corner 811 (first corner) and a corner 812 (first corner). The display area 805 shown in FIG. 8 is semicircular in a plan view and has an imaginary corner 851 and an imaginary corner 852. The description below assumes, for convenience, that the first substrate 801 and the display area 805 are symmetric in the left-right direction in a plan view.

The imaginary corner 851 and the imaginary corner 852 shown in FIG. 8 have an acute angle in a plan view. The corner 811 and the corner 812 are either chamfered or rounded. The corner 811 and the corner 812 have a larger radius of curvature than do a corner 821 and a corner 822. Referring to FIG. 8, the imaginary corner 852 and the corner 812 are separated by a smaller distance than are the imaginary corner 852 and the corner 822 in a plan view. In other words, as shown in FIG. 8, the relationship, "Distance D871<Distance D872," holds.

The second substrate 802 includes a first portion 807 opposite a main face of the first substrate 801 and a second portion 808 extending out of the first substrate 801. The second substrate 802 is shaped by a combination of a rectangle and a semicircle and includes the portion 808 extending out of a straight portion of the first substrate 801. The second substrate 802 has the corner 821 (second corner) and the corner 822 (second corner) in a plan view. The corner 821 and the corner 822 are approximately 90° in a plan view.

The first polarizer 803 is identical in shape to the first substrate 801 in a plan view. The first polarizer 803 has a corner 831 (corner, first corner) corresponding to the imaginary corner 851 and a corner 832 (corner, first corner) corresponding to the imaginary corner 852. The corner 831 and the corner 832 of the first polarizer 803 are either chamfered or rounded.

The second polarizer 804 is identical in shape to the second substrate 802 in a plan view. The second polarizer 804 has a corner 841 (other corner) corresponding to the imaginary corner 851 and a corner 842 (other corner) corresponding to the imaginary corner 852. The corner 831 and the corner 832 of the first polarizer 803 are either chamfered or rounded. The relationship, "Distance D871<Distance D872," holds as described above. The corners that are the closest to the display area 805 (i.e., the corner 831 and the corner 832) have the gentlest shape.

Figure 9:
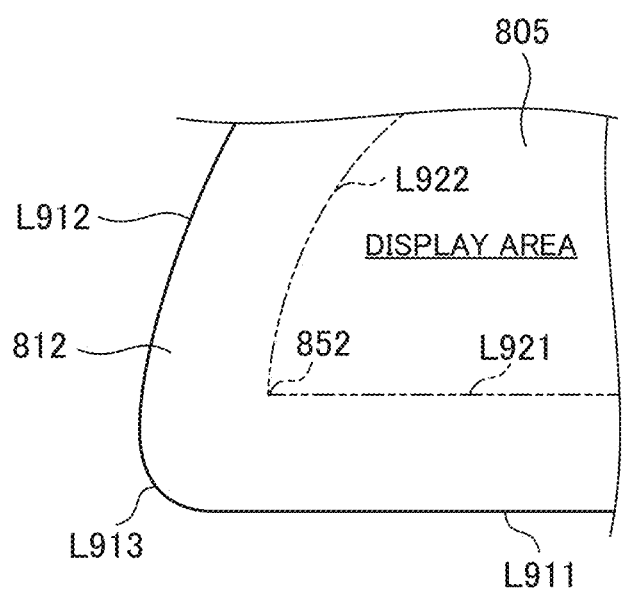
FIG. 9 is a schematic partial plan view of an exemplary second corner of a first substrate in accordance with the second embodiment.

FIG. 9 is a schematic partial plan view of an example of the corner 812 of the first substrate 801. In FIG. 9, the imaginary corner 852 is represented in a plan view by an imaginary line segment L921 and an imaginary curved line L922 that cross at an acute angle. In FIG. 9, the corner 812 is represented in a plan view by a combination of a line segment L911, a curved line L912, and a curved line L913. In other words, the corner 812 has a partially curved side face. The corner 812 has a larger radius of curvature than does the imaginary corner 852.

Accordingly, among all the corners of the first substrate 801, the second substrate 802, the first polarizer 803, and the second polarizer 804, the corner that is the closest to the display area 805 has the gentlest shape. For the reasons given earlier, an uneven display is rendered less likely across the display panel 100.

Variation Example 5

Figure 10:
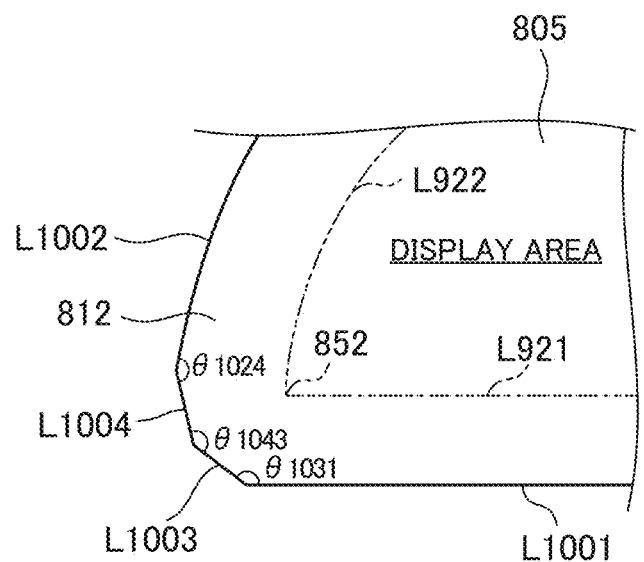
FIG. 10 is a schematic partial plan view of another exemplary second corner of the first substrate in accordance with the second embodiment.

FIG. 10 is a schematic partial plan view of a variation example of the corner 812 of the first substrate 801. In FIG. 10, the imaginary corner 852 is represented in a plan view by the imaginary line segment L921 and the imaginary curved line L922 that cross at an acute angle. In FIG. 10, in a plan view, the corner 812 resides between a line segment L1001 and a curved line L1002 and is shaped by a plurality of line segments, for example, a line segment L1003 and a line segment L1004.

The line segment L1003 and the line segment L1001 make an angle θ1031, the line segment L1004 and the line segment L1003 make an angle θ1043, and the line segment L1001 and the curved line L1002 make an angle θ1024. The angle θ1031, the angle θ1043, and the angle θ1024 are all obtuse. In other words, the corner 812 shown in FIG. 10 has a pair of flat side faces that meet at an angle larger than 90°.

The corner 811 may be identical in shape to the corner 812 shown in FIG. 10 and may have a different shape from the corner 812. At least one of the corner 821 and the corner 822 may have the shape shown in FIG. 10.

The structure of the variation example of the corner 812 shown in FIG. 10, where the first substrate 801 and the second substrate 802 have gentle corners, can reduce stress concentration in the corners of the display area 805. For the reasons given earlier, an uneven display is rendered less likely across the display panel 100.

Variation Example 6

Figure 11:
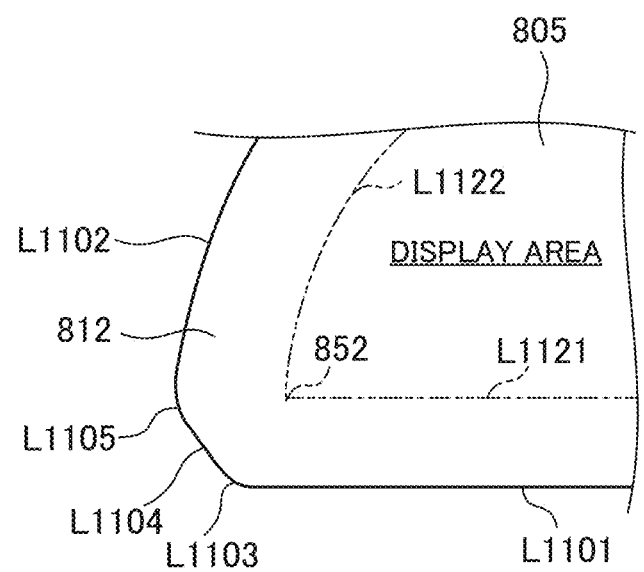
FIG. 11 is a schematic partial plan view of yet another exemplary second corner of the first substrate in accordance with the second embodiment.

FIG. 11 is a schematic partial plan view of a variation example of the corner 812 of the first substrate 801. In FIG. 11, the imaginary corner 852 is represented in a plan view by an imaginary line segment L1121 and an imaginary curved line L1122 that cross at an acute angle. In FIG. 11, in a plan view, the corner 812 resides between a line segment L1101 and a curved line L1102 and is shaped by a curved line L1103, a line segment L1104, and a curved line L1105. In other words, the corner 812 between the line segment L1101 and the curved line L1102 shown in FIG. 11 has a curved side face and a pair of flat side faces that meet at an angle larger than 90°.

The corner 811 may be identical in shape to the corner 812 shown in FIG. 11 and may have a different shape from the corner 812. At least one of the corner 821 and the corner 822 may have the shape shown in FIG. 11.

The structure of the variation example of the corner 812 shown in FIG. 11, where the corner that is the closest to the display area 805 among all the corners of the first substrate 801 and the second substrate 802 has the gentlest shape, can reduce stress concentration in the corners of the display area 805. For the reasons given earlier, an uneven display is rendered less likely across the display panel 100.

Third Embodiment

A description will be given next of a third embodiment. Identical or equivalent elements are denoted by the same reference numerals, and description thereof is not repeated. Description that appears in another embodiment will not be repeated in the following.

Figure 12:
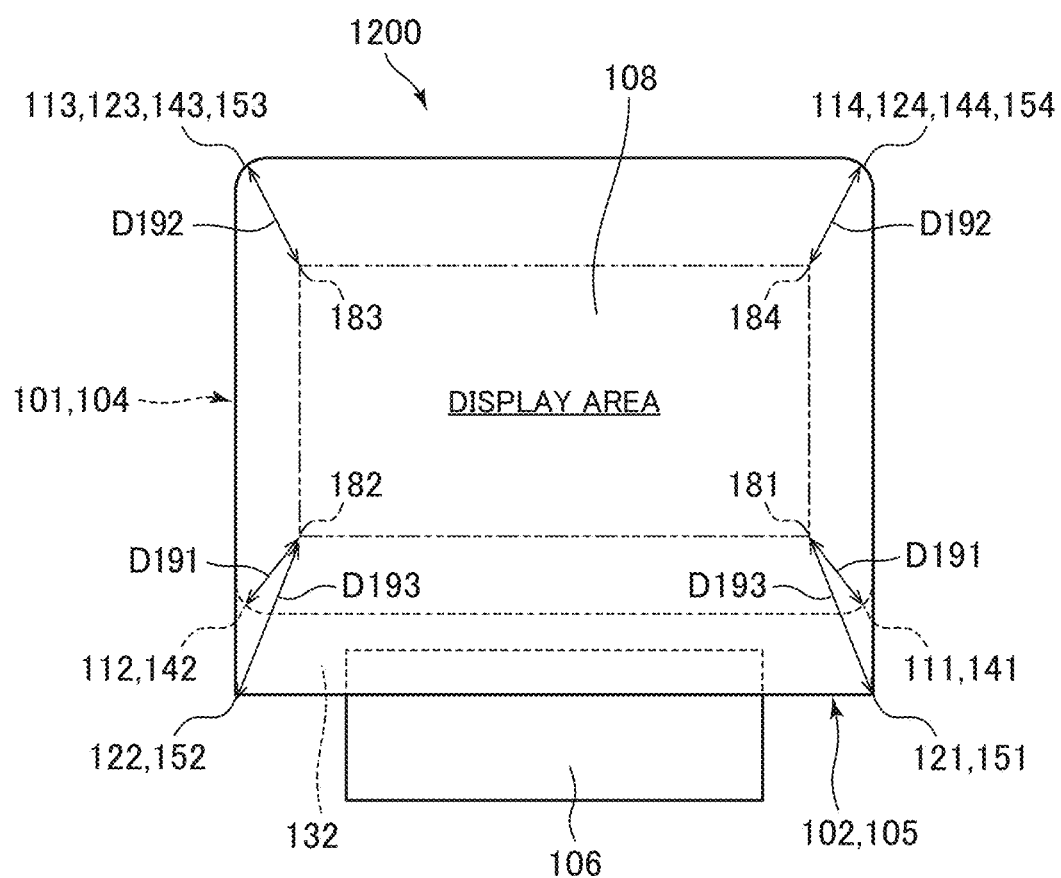
FIG. 12 is a schematic plan view of an exemplary display panel in accordance with a third embodiment.

FIG. 12 is a schematic plan view of an exemplary display panel 1200. The display panel 1200 shown in FIG. 12 differs from the display panel 100 shown in FIG. 1A in that the second substrate 102, extending out of the first substrate 101, has the display area 108. The display panel 1200 may be, for example, a multi-segment liquid crystal panel. Alternatively, the display panel 1200 may be a passive-matrix liquid crystal panel or a thin-film-diode liquid crystal panel.

In the display panel 1200, the corner of the first substrate 101 that is the closest to the corresponding imaginary corner of the display area 108 among all the corners of the first substrate 101 and the second substrate 102 has the gentlest shape. For the reasons given earlier, an uneven display is rendered less likely across the display panel 100.

Fourth Embodiment

A description will be given next of a fourth embodiment. Identical or equivalent elements are denoted by the same reference numerals, and description thereof is not repeated. Description that appears in another embodiment will not be repeated in the following.

Figure 13:
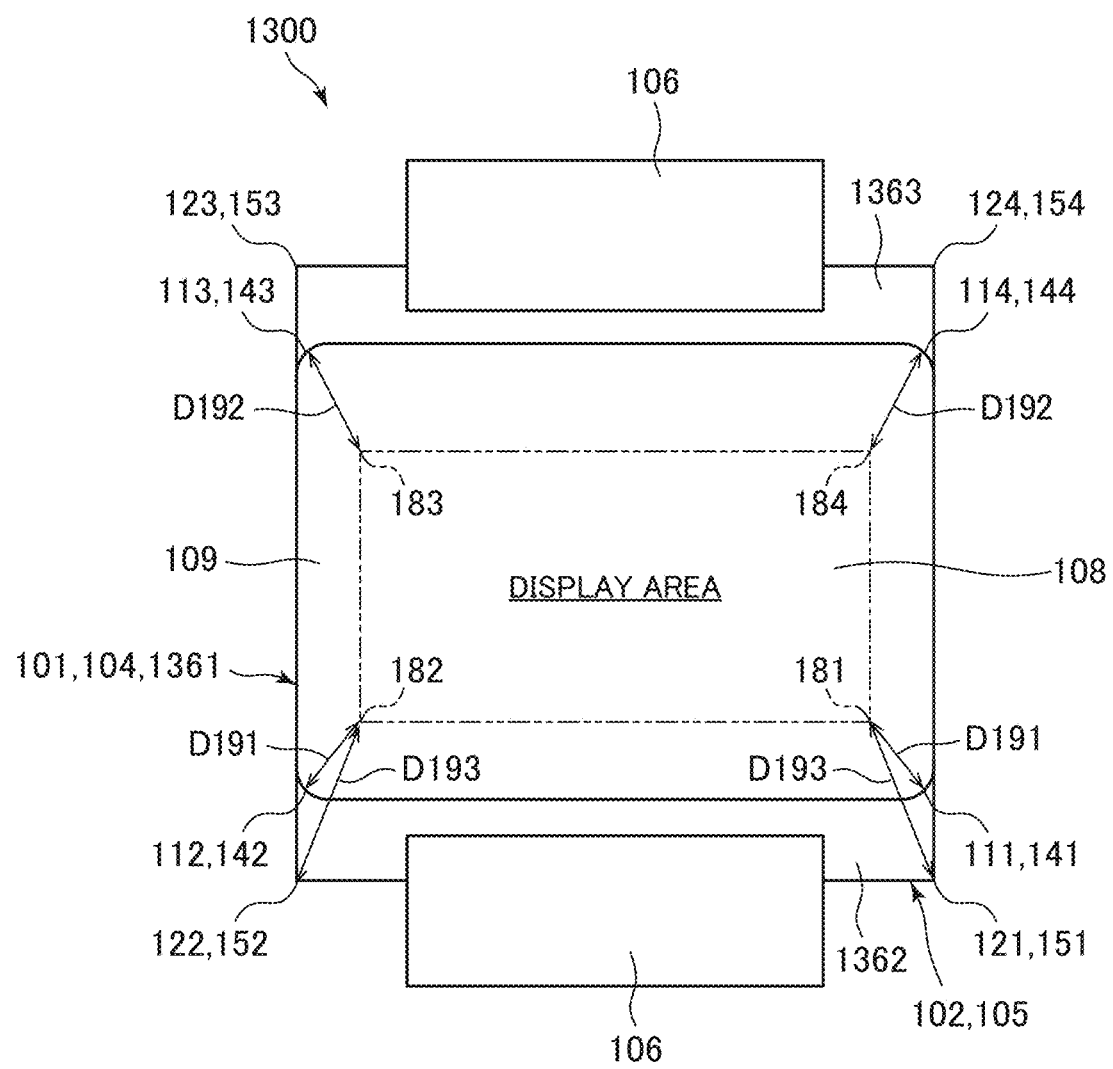
FIG. 13 is a schematic plan view of an exemplary display panel in accordance with a fourth embodiment.

FIG. 13 is a schematic plan view of an exemplary display panel 1300. The display panel 100 in accordance with the first embodiment differs from the display panel 1300 in accordance with the fourth embodiment in that the corner 121, the corner 122, the corner 123, the corner 124, the corner 151, the corner 152, the corner 153, and the corner 154 are approximately 90° in a plan view.

The second substrate 102 in accordance with the present embodiment has a first portion 1361 opposite a main face of the first substrate 101 and a second portion 1362 and a second portion 1363 extending out of the first substrate 101.

At least a part of the third substrate 106 resides in the second portion 1362 and the second portion 1363. In the display panel 1300, the third substrate 106 may be attached to either one of the second portion 1362 and the second portion 1363, and markings for model identification or manufacturing process management may be disposed on the other one of the second portion 1362 and the second portion 1363. In other words, in the display panel 1300, the third substrate 106 may be attached to either one of the second portion 1362 and the second portion 1363, and no third substrate 106 to the other one of the second portion 1362 and the second portion 1363.

In the display panel 1300, the corner of the first substrate 101 that is the closest to the display area 108 among all the corners of the first substrate 101 and the second substrate 102 has the gentlest shape. For the reasons given earlier, an uneven display is rendered less likely across the display panel 100.

The present disclosure is not limited to the description of the embodiments and examples above. Any structure detailed in the embodiments may be replaced by a practically identical structure, a structure that achieves the same effect and function, or a structure that achieves the same purpose.

What is claimed is:

1. A display panel comprising:
   a first substrate having a display area and a non-display area outside the display area, the display area having an imaginary corner, the first substrate having a first corner corresponding to the imaginary corner; and
   a second substrate including a first portion opposite a main face of the first substrate and a second portion extending out of the first substrate, the second substrate having a second corner corresponding to the imaginary corner, wherein
   the first corner is either chamfered or rounded, and
   the first corner has a larger radius of curvature than does the second corner.

2. The display panel according to claim 1, wherein in a plan view, the imaginary corner is separated from the first corner by a smaller distance than from the second corner.

3. The display panel according to claim 1, wherein
   the first substrate further has a third corner from which the imaginary corner is separated by a greater distance than from the first corner in a plan view, and
   the first corner has a larger radius of curvature than does the third corner.

4. The display panel according to claim 1, wherein the first corner has either a curved side face or a pair of flat side faces that meet at an angle larger than 90°.

5. The display panel according to claim 1, wherein the first substrate includes a glass plate.

6. The display panel according to claim 1, further comprising a polarizer opposite either the first substrate or the second substrate, the polarizer having another corner corresponding to the imaginary corner, wherein the other corner of the polarizer is either chamfered or rounded.

7. The display panel according to claim 1, further comprising a liquid crystal layer between the first substrate and the second substrate.

8. The display panel according to claim 7, further comprising, either on the first substrate or on the second substrate, a pair of electrodes through which voltage is applied across the liquid crystal layer.

9. The display panel according to claim 1, further comprising a housing in which the first substrate is fixed in an elastically deformed state.

\* \* \* \* \*